United States Patent [19]

Thumm

[11] Patent Number: 5,058,621
[45] Date of Patent: Oct. 22, 1991

[54] TANK BREATHER

[76] Inventor: Hein R. Thumm, Gomersal Road, Lyndoch, Australia

[21] Appl. No.: 536,506

[22] Filed: Jun. 12, 1990

[30] Foreign Application Priority Data

Jun. 15, 1989 [AU] Australia ................. PJ4752

[51] Int. Cl.⁵ .......................... F16K 49/00
[52] U.S. Cl. ................. 137/340; 137/587; 220/205; 220/371; 220/374
[58] Field of Search ......... 220/371, 374, 204, 205; 137/587, 340; 251/144

[56] References Cited

U.S. PATENT DOCUMENTS

| | | | |
|---|---|---|---|
| 2,565,674 | 8/1951 | Zachlin ............... | 220/374 |
| 3,096,390 | 7/1963 | Deniau ............... | 137/587 |
| 3,385,468 | 5/1968 | Fleming et al. ....... | 220/371 |
| 3,609,945 | 10/1971 | Saradzhev ........... | 220/371 |
| 3,888,382 | 6/1975 | Blumhardt ........... | 220/371 |
| 4,309,155 | 1/1982 | Heinz et al. ......... | 137/587 |
| 4,466,251 | 8/1984 | Chellis et al. ....... | 137/340 |
| 4,552,175 | 11/1985 | Schiemann ........... | 137/587 |
| 4,854,469 | 8/1989 | Hargest ............... | 220/205 |

FOREIGN PATENT DOCUMENTS 452022 11/1949 Italy ................... 137/587

Primary Examiner—A. Michael Chambers
Attorney, Agent, or Firm—Robert Louis Finkel

[57] ABSTRACT

In this invention, a breather device for a tank comprises a closed reservoir above the container but having a conduit which depends into the container and has an opening which determines liquid level in the container. The container comprises air inlet means which will allow entry of air into the container from above liquid level, and a breather tube which opens into the container below liquid level (or vice versa) so that liquid normally closes the air flow path to the breather tube, but the depth of water level is so small that a slight pressure differential only is required to cause sufficient displacememt of water to open that air flow path.

10 Claims, 3 Drawing Sheets

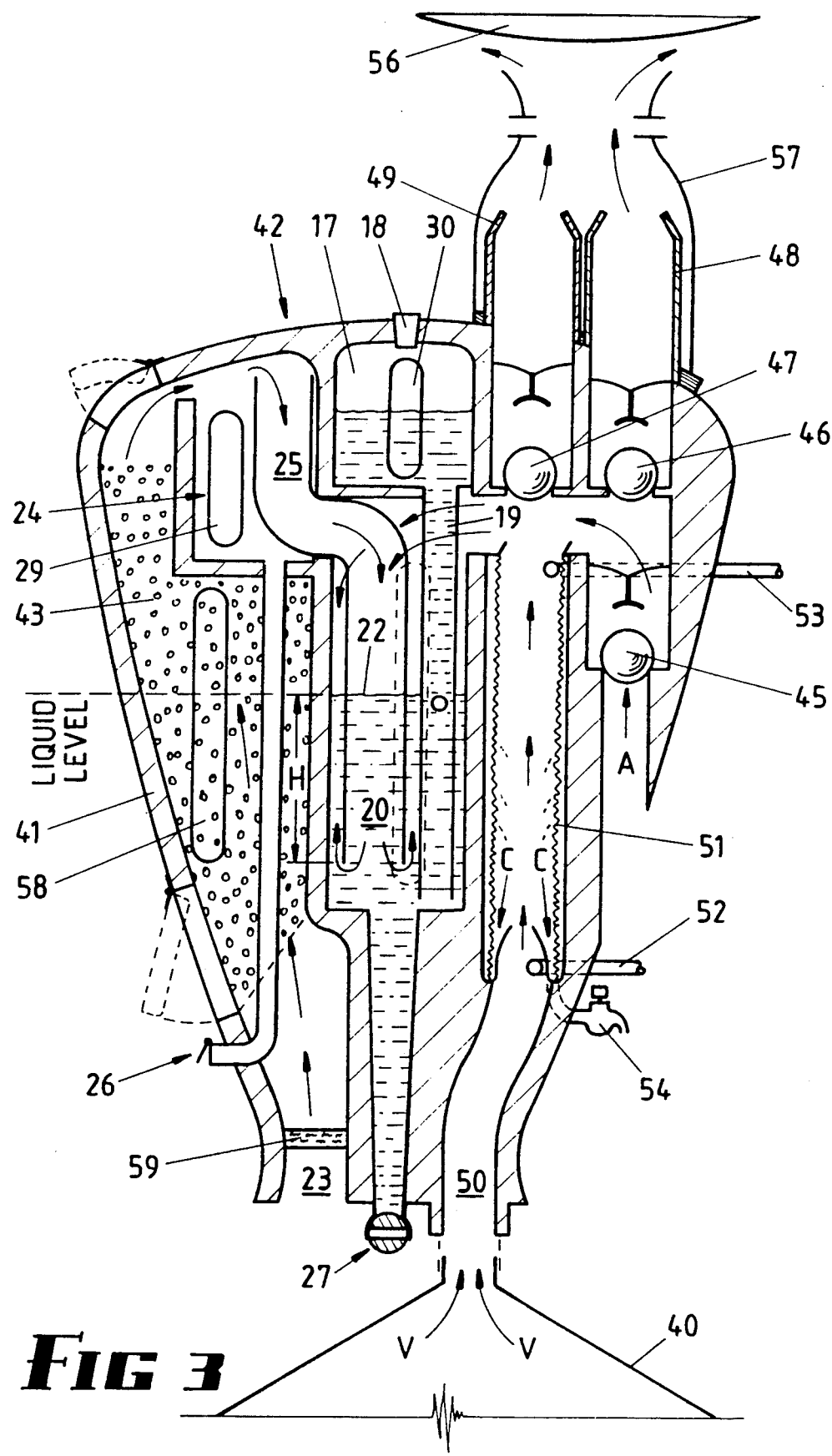

TANK BREATHER

This invention relates to a breather device for a tank, and although not limited to use in a wine tank or a petroleum tank, is particularly suitable for such use, whether the tank is full or ullaged.

BACKGROUND OF THE INVENTION

Wine tanks commonly are provided with breathers near their cone ends, the usual breather comprising a relatively large diameter tube which leads into a water trap, which, when in use, contains water with sulphur dioxide, the water trap being constituted by an open top container. It is important that as little oxygen as possible enters the wine tank, and the container contains a sulphurous water solution through which air and other gases or vapours will bubble as temperature rises, for example on a hot day, but on a colder day if the temperature decreases, the water level in the container can drop and some water may be sucked back into the tank of wine via the tank breather pipe. Because of the volume and height of water being sucked via the breather pipe, tanks can implode if the pressure drop is rapid. There are several problems associated with such a breather arrangement however. Firstly the open top containers collect dust and other debris which can contaminate the wine. Even more importantly however a drop water of water level is not always noticed, and upon loss of water, the breather pipe allows oxygen to continuously enter the tank, and this is deleterious to the quality of the wine.

The most serious problem however is implosion, and the main object of this invention is to provide improvements which will reduce the probability of implosion and reduce the probability of water level dropping to a point wherein oxygen can continuously enter the tank.

BRIEF SUMMARY OF THE INVENTION

In this invention, a breather device for a tank comprises a closed reservoir above the container but having a conduit which depends into the container and has an opening which determines liquid level in the container. The container comprises air inlet means which will allow entry of air into the container from above liquid level, and a breather tube which opens into the container below liquid level (or vice versa) so that liquid normally closes the air flow path to the breather tube, but the depth of water level is so small that a slight pressure differential only is required to cause sufficient displacement of water to open that air flow path.

More specifically, the invention consists of a tank breather comprising a container, a reservoir above the container, a conduit depending from the reservoir and having an opening into the container between upper and lower ends thereof, closure means above the reservoir inhibiting air flow access into the reservoir except through said conduit, such that a normal level of liquid flowing into the container from the reservoir is determined by the position of said opening, a breather passage and an air inlet passage both in communication with the container but one of the passages opening into the container above the normal liquid level and the other below the normal liquid level, such that flow between the passages is inhibited by liquid in the container until differential pressures in the passages vary liquid level in the container.

BRIEF DESCRIPTION OF THE DRAWINGS

Two embodiments of the invention are described hereunder in some detail with reference to and are illustrated in the accompanying drawings in which:

FIG. 3 is a cross-section of a slightly modified breather device attached to a gasoline tank.

DETAILED DESCRIPTION OF THE PREFERRED EMBODIMENTS

Figure 1:
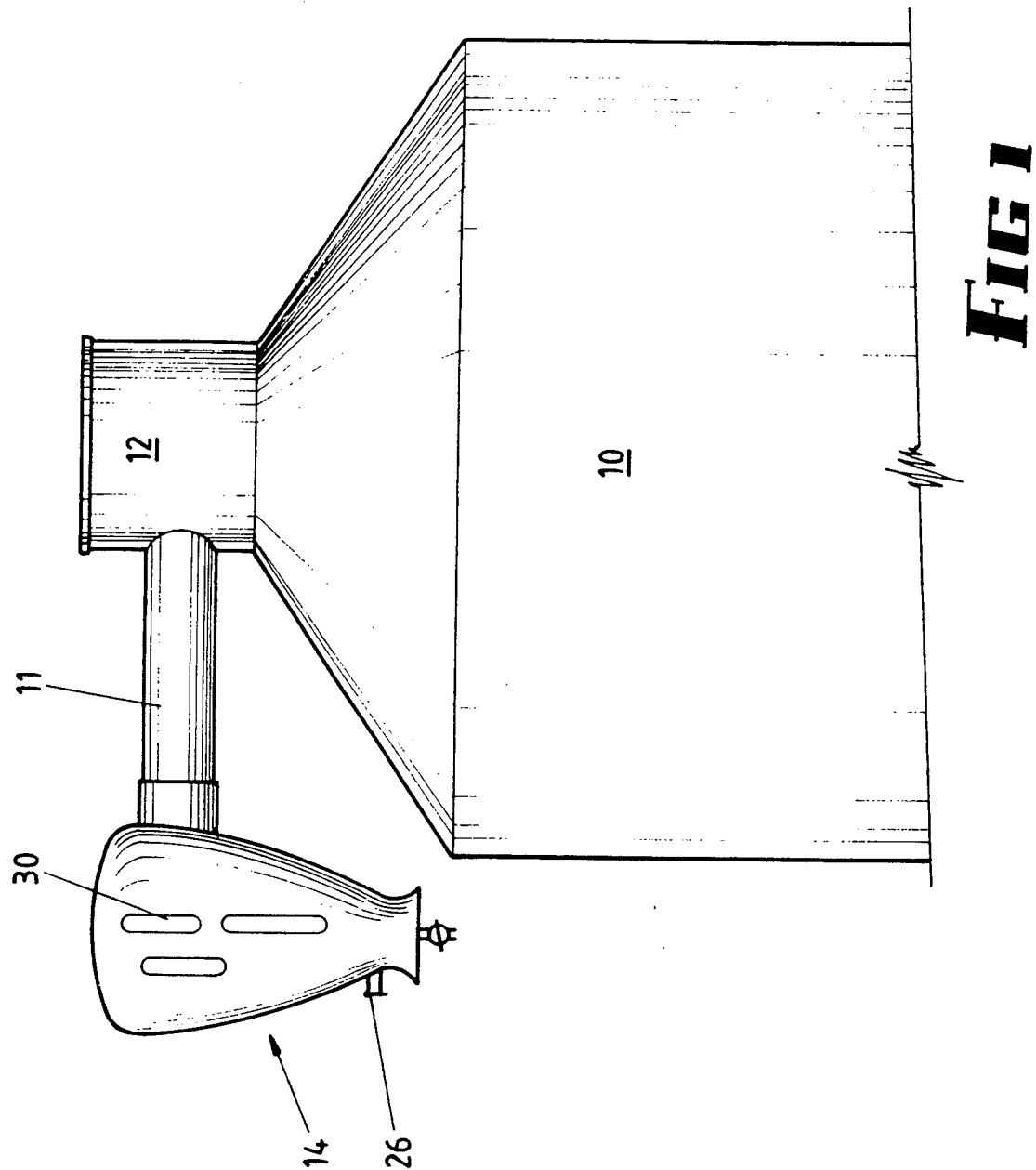
FIG. 1 is a side elevation of a wine tank having a breather device according to this invention attached thereto.
Figure 2:
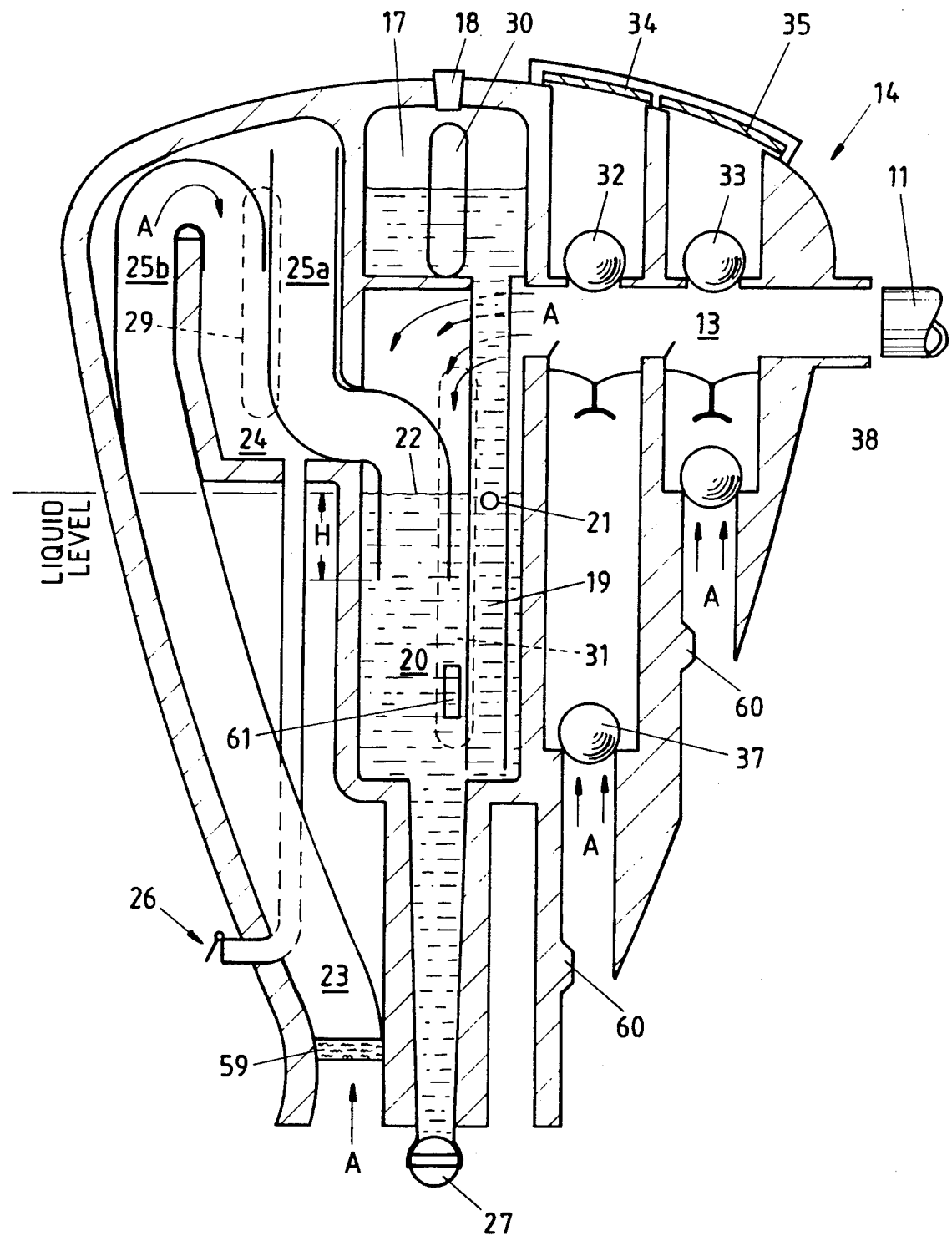
FIG. 2 is a cross-section of a breather device of FIG. 1.

In FIGS. 1 and 2, a wine tank 10 is provided with a breather pipe 11 extending radially outwardly from its neck 12, the breather pipe 11 being in communication with a breather passage 13 within a tank breather 14.

The tank breather 14 contains a reservoir 17 which is normally closed by a bung and seal 18, the reservoir 17 having a depending conduit 19 which depends into a container 20. The conduit 19 is provided with an aperture 21 which determines the liquid level 22 within the container 20.

There is also provided an air inlet passage 23 which allows air to flow (arrows A) into the container 20 but above the liquid level 22. However the passage includes passage through a liquid trap 24, and a first tube 25a extends from below the water level 22 to the top of the trap and is directed upwardly, while the air in the passage 23 enters the top of the trap 24 and is directed downwardly through a second tube 25b which also opens to the top of the trap 24, and extends downwardly to open to atmosphere. The trap is automatically emptied of liquid by a weighted (or spring loaded) release valve 26 adjusted to open when water enters the trap, or this may be manually operated if required. The height "H" of liquid between the bottom edge of tube 25 and the surface of the liquid is a function of the pressure differential needed to allow air flow between the breather passage 13 and air inlet passage 23. The container 20 and reservoir 17 can simultaneously be emptied by a drain valve 27 located below the container 20 for cleaning or replenishing. The liquid contained in the reservoir 17 and container 20 is an aqueous solution of sulphur dioxide which is desirable for limiting ingress of bacteria and fungus spores to the wine tank 10, and to supply antioxidant $SO_2$ vapour to be drawn into the tank under vacuum conditions.

In normal usage, if the temperature increases and the wine tank fluids expand, they can flow directly out of valves 34 and 35 which open before liquid in container 20 is fully depressed to allow free flow through the container 20. The vapours which are lost in this mode of operation are negligible and do not adversely affect the quality of wine. Upon cooling of the wine tank 10, air from the surrounding atmosphere is drawn into the wine tank through the air inlet passage 23, depressing the liquid level 22 within the lower end of the tube 25 until the air can bubble back through the liquid 20 and pass back into the wine tank. The sight glasses 29, 30 and 31 enable an operator to quickly see the existence of liquid in the liquid trap 24, and the amount of liquid in the container 20 and in the reservoir 17.

However conditions can occur when the displacement of fluids from within the tank 10 is very rapid. If for example the tank is being filled very quickly, then the two unidirectional valves 32 and 33 will open the breather passage 13 to atmosphere, and in addition or as an alternative, the two one-way flap valves 34 and 35 will open to allow quick egress of vapours from within the tank without excessive pressure being built up. It will be appreciated by those in the art that the tanks although constructed from stainless steel usually about 1.5 to 2 mms thick have such large areas that damage is likely to occur even upon positive pressure existing in the tank 10. The existence of the valves 32, 33, 34 and 35 do much to reduce this danger.

A much more dangerous situation however occurs when the liquid contents of a tank are suddenly discharged since only a small pressure is required to implode the walls of the tank 10. In order to reduce this danger, there are provided two further unidirectional valves 37 and 38 which allow immediate ingress of air into the tank, in this embodiment at about 2.4 inches (60 mm) of water head. This is a slightly greater pressure differential than the pressure differential which is imparted by the liquid level 22 being above the bottom end of tube 25.

The requirements of a gasoline tank can also be met by this invention. As in the case of the wine tank, contamination of a gasoline tank can occur but in that instance contamination is mainly due to condensation of water vapour contained in the air which is drawn into the tank upon lowering the temperature. The tank "breathes" upon small differentials of temperature. FIG. 3 illustrates a valve which is substantially similar to that shown in FIG. 2, and connected to the upper end of a gasoline tank 40. Normal outflow of vapours from the tank 40 will take place through the container 20 which supplies a back pressure of up to 5 k Pa to reduce outflow of vapours. The container 20 however contains for its liquid not sulphurous aqueous solution as in the first embodiment but ethylene glycol (or other moisture absorbent liquid) which will absorb moisture vapour but not the vapours of petroleum products. It should be noted that tube 25 is much longer than in the wine tank mode, to reduce likelihood of ethylene glycol being drawn back into the gasoline tank 40. In order to increase the absorption of moisture vapour, the outer part of the body 41 of a tank breather 42 comprises a compartment sufficiently large to contain a quantity of particulate silica gel 43 (or other moisture absorbing material). As the contents of the tank are removed, the flow rate is likely to be such that most if not all of the air which is caused to flow into the tank 40 passes through the container 20. If however there is a more rapid discharge, the unidirectional valve 45 will open and allow rapid inflow of air, this however being a most unusual occurrence.

A far more usual occurrence is rapid filling of a tank from a tanker, and the vapours and air contained within the tank can then rapidly discharge, with the aid of a venturi 'neck' which reduces risk of expelling liquid from container 20, through the two unidirectional valves 46 and 47, being discharged through the vent pipes 48 and 49 respectively, which may have discharge nozzles to impart velocity to vapours so as to more effectively diffuse them into the surrounding atmosphere. A snow shed cover 56 is required in cold climates, and may overlie a diffusion shroud 57 which embodies venturi openings, which entrain air when vapours are rapidly expelled from the breather, and dilute the vapours.

In both FIGS. 2 and 3, a very large air flow passage exists when the water level is displaced by the distance "H", and this provides means whereby a tank is protected against wall damage due to excessive pressure or vacuum.

A great deal of loss occurs from many gasoline tanks due to evaporation, and to reduce the amount of loss due to vaporisation, the vapours pass upwardly from the tank 40 through a breather passage 50 which includes a chilled water heat exchanger 51 through which chilled water passes from conduit 52 and is recirculated to a cooling device (not shown) via conduit 53. This will have the effect of liquifying many of the vapours which otherwise escape to atmosphere, and the liquid vapours not flowing back into tank 40 can be recovered via a cock 54. In lieu of chilled water, the breather passage can be insulated, and contain a stack of discrete metal, for example stainless steel ° wool° .

Alternative heat exchangers known in the art may also be used. Other elements of the breather 42 are the same as the elements of breather 14 and bear the same designations, with the further addition however of a sight glass 58 which is in addition to the sight glasses 29, 30 and 31 and is useful for identifying the condition of the silica gel which needs periodic treatment to remove moisture which has been absorbed by it.

A filter pad 59 may be used to inhibit dust entry into the device, and whistles 60 may be inserted in some instances, at locations where they function upon excessive air flow taking place to provide an audible warning signal.

The invention provides an effective breather useful in many storage installations wherein expansion or contraction within a tank may cause detrimental effects, or wherein a variable pressure/vacuum release valve may be required.

A valve may be used as a very large capacity safety valve, as a pressure release valve when mechanical valves, such as valves 34 and 35, remain closed.

Many variations and additions may be included in a valve according to this invention, for example, an indicator paper 61 aligned with sight glass 31 and in container 20, to indicate the pH of the $SO_2$ solution.

I claim:

1. A tank breather comprising a container, a reservoir above the container, a conduit depending from the reservoir and having an opening into the container between upper and lower ends thereof, a filler opening above the reservoir, closure means closing the filler opening and co-operating with walls defining the reservoir to inhibit air flow access into the reservoir except through said conduit, such that a normal level of liquid in the container is determined by the position of said opening and maintained from the reservoir, a breather passage and an air inlet passage both in communication with the container but one of the passages opening into the container above the normal liquid level and the other below the normal liquid level, such that flow between the passages is inhibited by liquid in the container until differential pressures in the passages vary liquid level in the container.

2. A tank breather according to claim 1 wherein said breather passage opens into said container above said normal liquid level and said air inlet passage opens into said container below said normal liquid level.

3. A tank breather according to claim 1 further comprising walls defining a liquid trap, said air inlet passage having a first tube having a lower end terminating in said container and an upper end terminating adjacent the top of the liquid trap, the inlet passage also having a second tube having an upper end terminating adjacent the top of the water trap and a lower end opening to atmosphere.

4. A tank breather according to claim 3 wherein said liquid trap comprises drain means.

5. A tank breather according to claim 1 wherein said liquid is ethylene glycol.

6. A tank breather according to claim 1 or claim 3 wherein said breather passage comprises at least one one-way valve which opens to atmosphere upon increase in pressure in the breather passage.

7. A tank breather according to claim 1 or claim 3 wherein said breather passage further comprises at least one unidirectional valve which opens to atmosphere upon decrease of pressure in the breather passage.

8. A tank breather according to claim 1 wherein said breather passage comprises a heat exchanger, and coolant means coupled to the heat exchanger, the heat exchanger being oriented to return downwardly condensate of vapour passing upwardly through the heat exchanger.

9. A tank breather according to claim 1 wherein said tank breather comprises a body which incorporates a compartment containing particulate moisture absorbing material, said compartment being comprised in said air inlet passage.

10. A tank breather according to claim 9 wherein said liquid is an aqueous solution of sulphur dioxide.

* * * * *